United States Patent [19]

Chiba

[11] Patent Number: 5,678,310
[45] Date of Patent: Oct. 21, 1997

[54] METHOD OF EVENLY SPACING BALLS IN BALL BEARING AND APPARATUS FOR IT

[75] Inventor: Kazuyasu Chiba, Fujisawa, Japan

[73] Assignee: NSK Ltd., Tokyo, Japan

[21] Appl. No.: 427,044

[22] Filed: Apr. 24, 1995

[30] Foreign Application Priority Data

Apr. 25, 1994 [JP] Japan ................... 6-086568

[51] Int. Cl.$^6$ ................... F16C 43/06
[52] U.S. Cl. ................... 29/898.061; 29/898.09; 29/464; 29/898.062
[58] Field of Search ................... 29/898.061, 898.09, 29/898.062, 898.064, 724, 464

[56] References Cited

U.S. PATENT DOCUMENTS 3,842,472  10/1974  Rottacker et al. ................... 29/724
4,364,170  12/1982  Ratliffe ................... 29/898.062
5,421,088   6/1995  Kawamura ................... 29/898.09

FOREIGN PATENT DOCUMENTS

0301043  12/1989  Japan ................... 29/898.062
5-104362   9/1991  Japan .
5-104361   4/1993  Japan .

Primary Examiner—Larry I. Schwartz
Assistant Examiner—Marc W. Butler
Attorney, Agent, or Firm—Helfgott & Karas, P.C.

[57] ABSTRACT

A ball bearing is assembled by evenly spacing the balls through the pressurized air which is directed axially to the balls from a plurality of nozzles and agitated by an agitating plate provided adjacent the balls on the side remote from the nozzles, such that the balls are circumferentially moved before evenly spaced apart from each other.

6 Claims, 9 Drawing Sheets

PRIOR ART

Fig. 2(B)

PRIOR ART

METHOD OF EVENLY SPACING BALLS IN BALL BEARING AND APPARATUS FOR IT

BACKGROUND OF THE INVENTION

The present invention is related to a method for evenly or uniformly spacing the plurality of balls in the circumferential direction prior to fitting the retainer during the assembly of a ball bearing.

DESCRIPTION OF THE RELATED ART

Figure 1A:
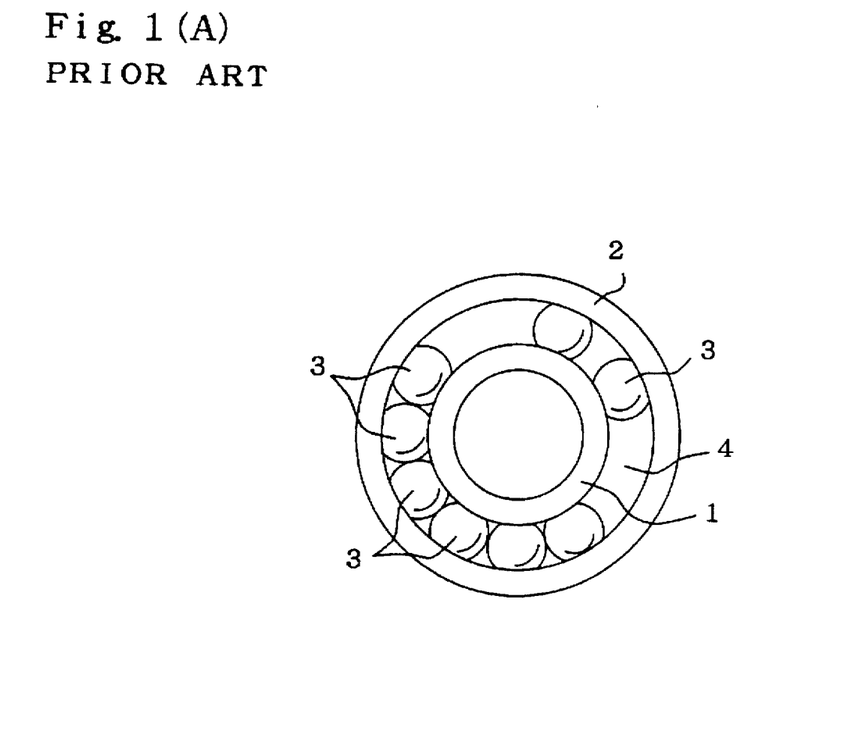
FIG. 1(A) is a plan view showing a condition during an assembly operation of a ball bearing before evenly spacing the balls.
Figure 1B:
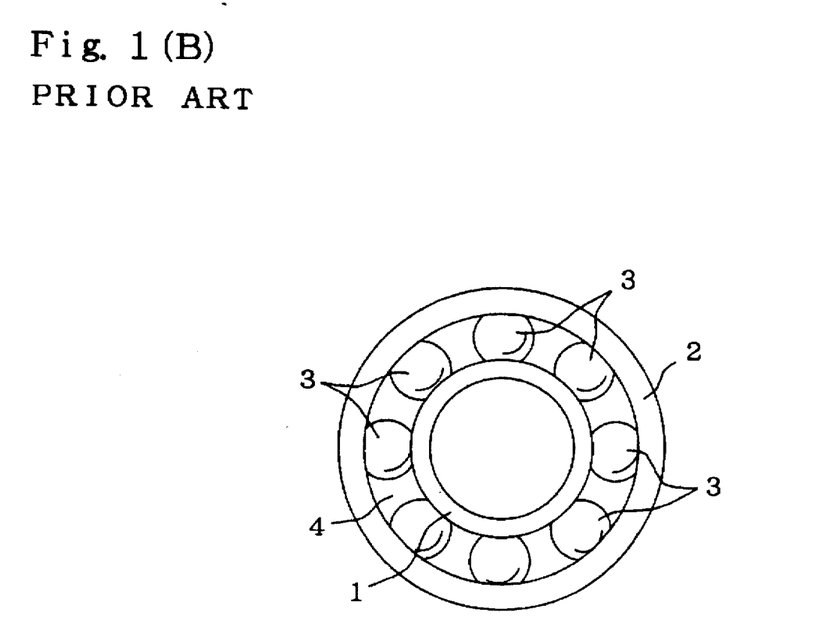
FIG. 1(B) is a plan view showing a condition during an assembly operation of a ball bearing after evenly spacing the balls.

When assembling a ball bearing, initially as shown in FIG. 1(A), a plurality of balls 3 are fitted between an inner ring raceway on an outer peripheral surface of an inner ring 1 and an outer ring raceway on an inner peripheral surface of an outer ring 2, and then the plurality of balls 3 are evenly spaced in the circumferential direction as shown in FIG. 1(B). Subsequently, an annular shaped retainer (not shown in the figure) is inserted into the annular space 4 between the outer raceway and the inner raceway, to thereby retain the plurality of balls 3 so as to be freely rotatable.

Figure 2A:
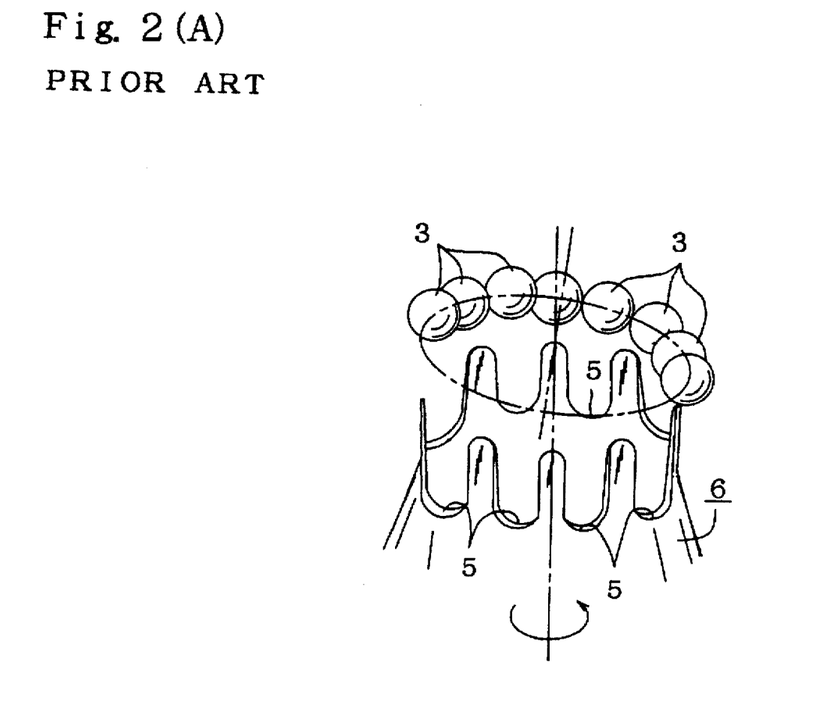
FIGS. 2(A) and 2(B) are a perspective view showing steps in a process of evenly positioning the balls according to a first example of a conventional method.
Figure 2B:
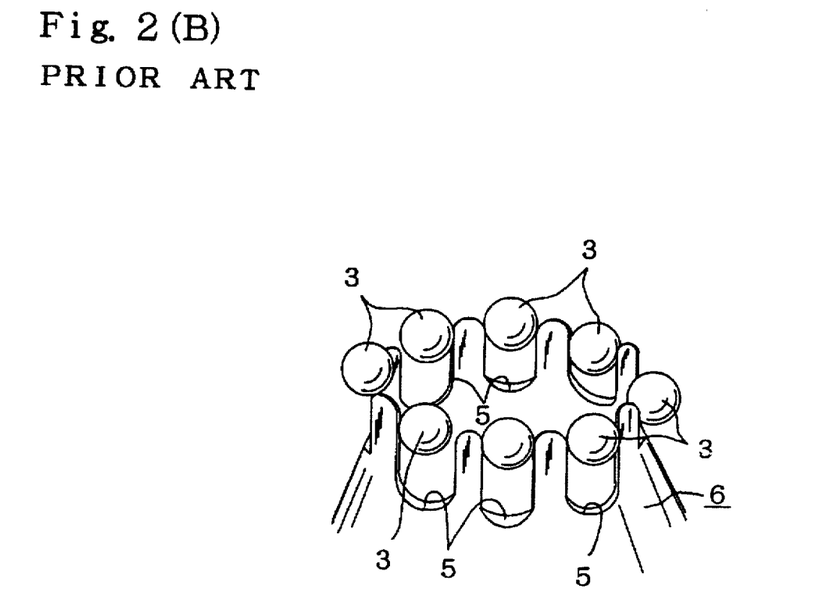

Apparatus for rearranging a plurality of balls 3 which have been fitted with uneven spacing as shown in FIG. 1(A) into the annular space 4 so as to be evenly spaced as shown in FIG. 1(B) have heretofore been disclosed for example in Japanese Examined Patent Publication KOKOKU No. 63-54503. This conventional apparatus as shown in FIG. 2(A), has a positioning arm 6 with annularly arranged fingers which form a number of concavities 5 equal to the number of balls 3, such that one ball is freely engaged in each respective concavity 5. During the positioning operation, the positioning arm 6 is brought towards the balls 3 while being rotated at an incline with respect to the balls 3. Then once the balls 3 are retained in the respective concavities 5 as shown in FIG. 2(B), the positioning arm 6 is removed.

Figure 3:
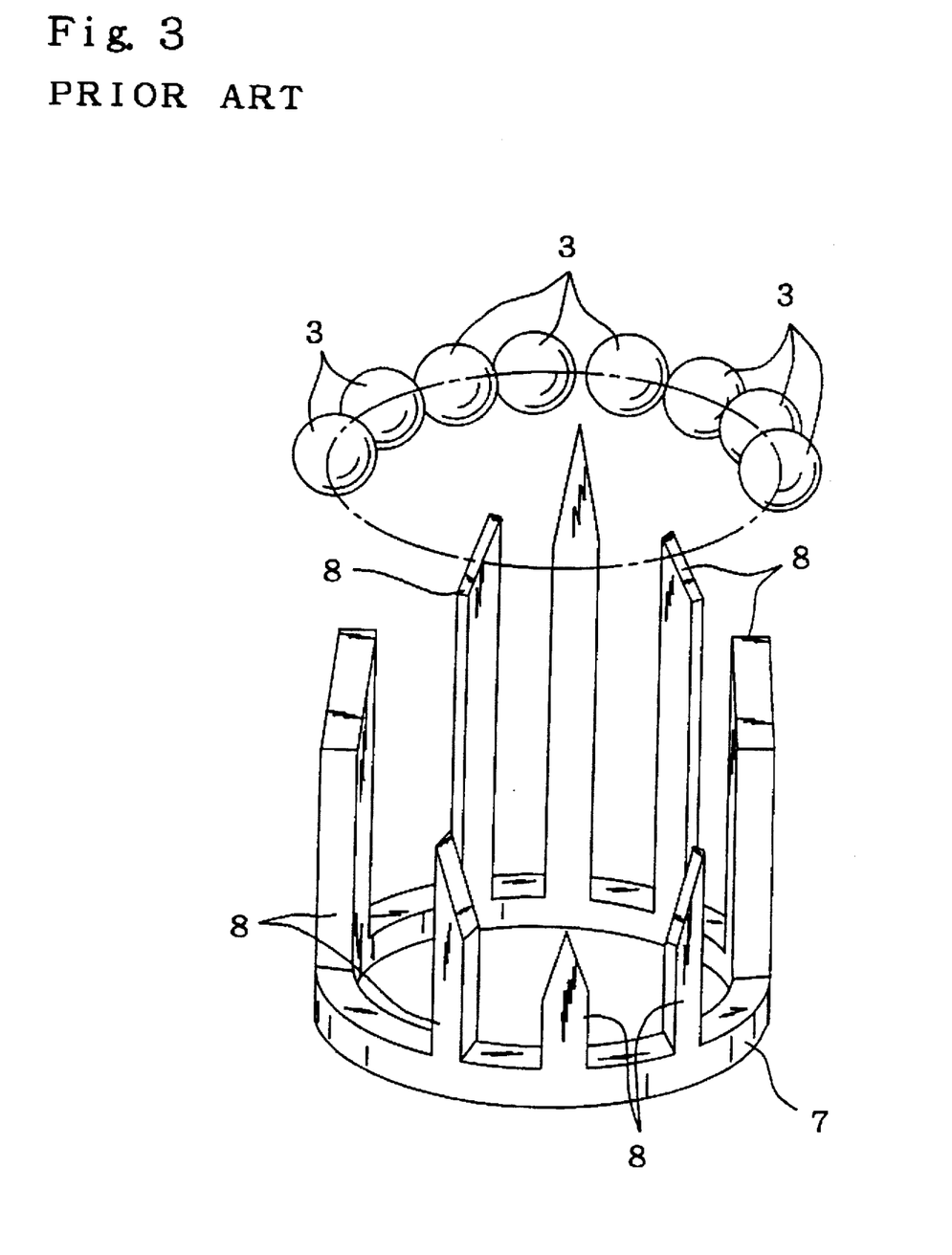
FIG. 3 is a perspective view showing a second example of a conventional method.

In another apparatus as shown in FIG. 3, parting prongs 8 have different lengths and inclined tips so as to extend in parallel at even spacing from an annular base 7. During the positioning operation, the parting prongs 8 are inserted between the balls 3, so that the balls become evenly spaced as they move into position between the prongs 8.

With the conventional apparatus constructed as described above however, in both cases there is the possibility of damage to the surface of the balls 3 due to friction between the balls 3 and the positioning ring 6, or the parting prongs 8.

Also there is the possibility of foreign matter being introduced.

Moreover, if the positioning operation is carried out to evenly space the balls 3 of a double row ball bearing, it cannot be simply performed in the above manner, since the ends of the positioning ring 6, or of the parting prongs 8 will interfere with the other row of balls.

Figure 4A:
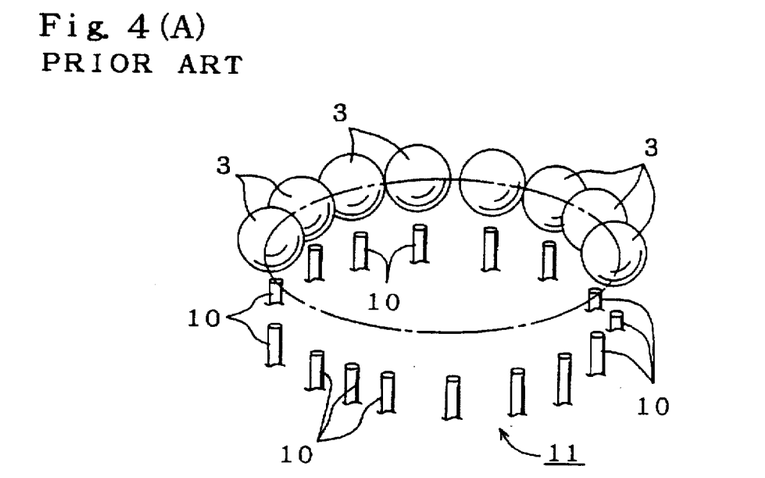
FIGS. 4(A) to 4(C) are a perspective view showing steps in a process of the first embodiment of a method disclosed in Japanese Patent First Publication KOKAI No. 5-104362.
Figure 4B:
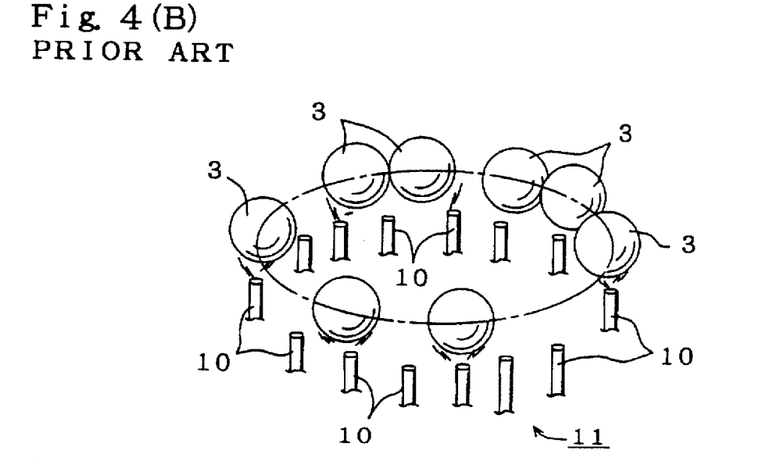
Figure 4C:
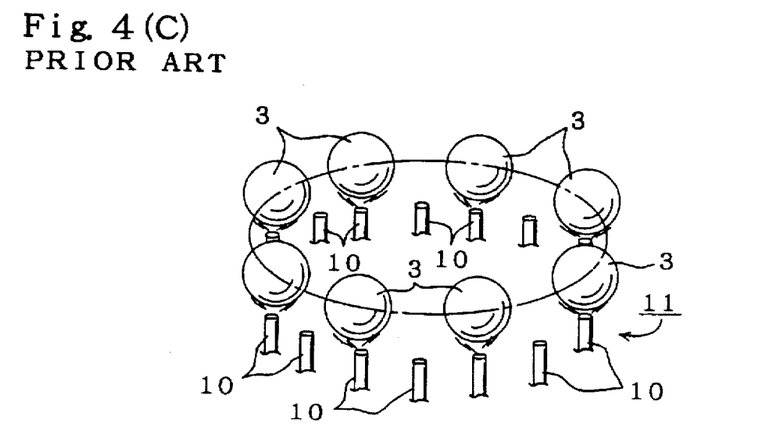

In order to address the above problems, there has been disclosed in Japanese Patent First Publication KOKAI Nos. 5-104361 and 5-104362, technology which utilizes the flow of pressurized fluid such as compressed air in the positioning operation to evenly space the balls 3. FIGS. 4(A) to 4(C) show one embodiment of the invention disclosed in Japanese Patent First Publication KOKAI No. 5-104362. In this embodiment, a nozzle apparatus 11 comprises a plurality of nozzles 10 with the number (16 in total) being twice the number of balls 3 to be positioned (8 in the present embodiment). The nozzles 10 are provided at even spacing in a circumferential direction on one face of an annular manifold 9 (refer to FIG. 6; not shown in FIGS. 4(A) to 4(C)). The manifold 9 is communicated with a discharge outlet of a compressor used to supply compressed air (being one type of a pressurized fluid). Respective valve units of the magnetically opened and closed type (not shown in the figure) are provided in the air supply paths to the respective nozzles 10. These valve units are opened and closed independently of each other in response to signals from a control unit (not shown in the figure).

By utilizing the nozzle apparatus 11 constructed as described above to evenly space the balls 3 which are unevenly spaced a shown in FIG. 4(A) between the inner ring raceway and the outer ring raceway, in a circumferential direction as shown in FIG. 4(C), the positioning operation is carried out in the following manner.

Initially as shown in FIG. 1(A), the plurality of balls 3 are fitted between an inner ring raceway on an outer peripheral surface of an inner ring 1 and an outer ring raceway on an inner peripheral surface of an outer ring 2. After this, the nozzle apparatus 11 is arranged to the side of the inner ring 1 and the outer ring 2, with the plurality of nozzles 10 facing the annular space 4 (see FIG. 1) between the inner raceway and the outer raceway.

Then as illustrated in FIG. 4(B), compressed air is discharged from one of or several of the nozzles 10, to thereby move the plurality of balls 3 circumferentially to evenly space the balls 3 in the circumferential direction as shown in FIG. 4(C).

Figure 5:
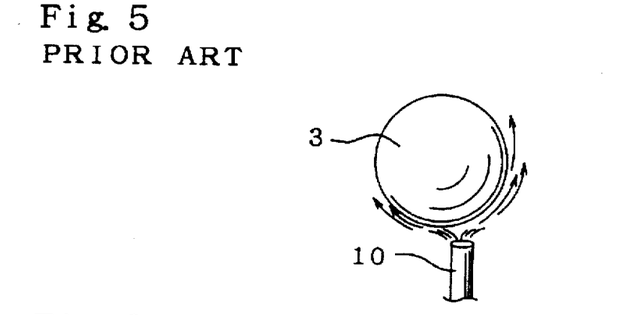
FIG. 5 is a perspective view showing a condition wherein a ball is drawn towards a nozzle.

With regards to this operation, when as shown in FIG. 5 the compressed air is discharged towards one of the balls 3 from one of the nozzles 10, then as is known from Bernoulli's theorem, the pressure acts on opposite sides of the ball 3 (static pressure), such that the pressure is lower on the fast flowing air side. Accordingly the ball 3 is drawn towards a central axis of the nozzle 10. Once aligned with the axis, the ball 3 is retained in position facing the nozzle 10 as long as the compressed air discharge therefrom continues.

Accordingly, the eight balls 3 can be moved circumferentially by appropriately switching on and off the discharge of compressed air from the sixteen nozzles 10 on the manifold 9. Hence if one ball is retained at each location opposite every second nozzle (i.e. eight nozzles), then the eight balls can be evenly spaced in the circumferential direction.

With the method of evenly spacing the balls of a ball bearing disclosed in Japanese Patent First Publication KOKAI No. 5-104362 and constructed as described above, the eight balls 3 are moved in the circumferential direction by the force from the compressed air. As a result, the possibility of damage to the surface of the balls 3, or the possibility of foreign matter being introduced thereto, no longer exists because with the positioning operation, there is no contact between the balls 3 and a metal positioning ring 6 (FIGS. 2(A) and 2(B)), or parting prongs 8 (FIG. 3). Moreover since the positioning ring 6 or the parting prongs 8 are not used, then when carrying out the positioning operation for the balls 3 of a double row ball bearing, the positioning of the balls of one row, does not interfere with the balls of the other row.

Figure 6:
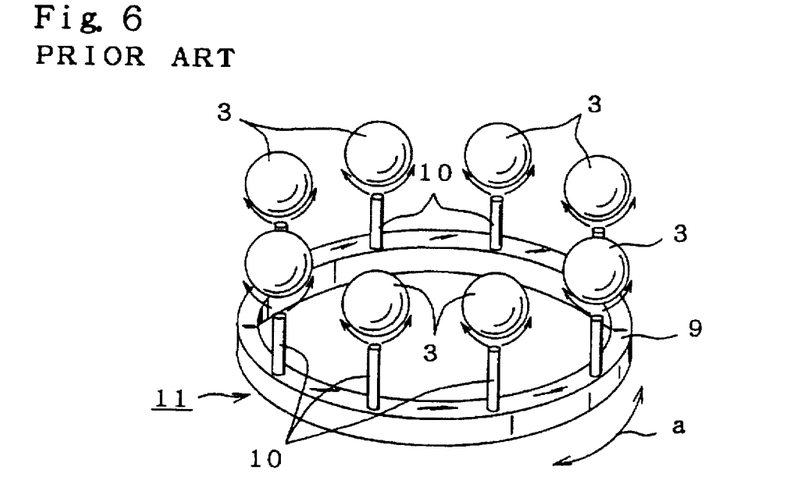
FIG. 6 is a perspective view showing a second embodiment of a method disclosed in the above publication.

FIG. 6 shows a second embodiment of the method disclosed in the abovementioned publication. With this embodiment, instead of the construction of the first embodiment wherein the nozzle apparatus 11 has twice the number of nozzles 10 (16 nozzles) as the number of balls 3 to be arranged (eight balls), the number of nozzles 10 is made the same as the number of balls 3 (ie. eight balls and eight nozzles), and the nozzles 10 together with the manifold 9 of the nozzle apparatus 11 are oscillated back and forth in the circumferential direction as shown by the arrow "a" in FIG. 6 so as to position the balls 3.

When arranging the balls 3 at an even spacing in the circumferential direction, the manifold 9 is oscillated back and forth in the circumferential direction while discharging compressed air from one or more of the nozzles 10, until there is one ball 3 retained at each location opposite to a respective nozzle 10. At the time of positioning, the oscillation speed and oscillation angle are appropriately specified to ensure that more than one ball 3 is not attracted to a single nozzle 10 (ie. so that extra balls 3 are dislodged).

Figure 7:
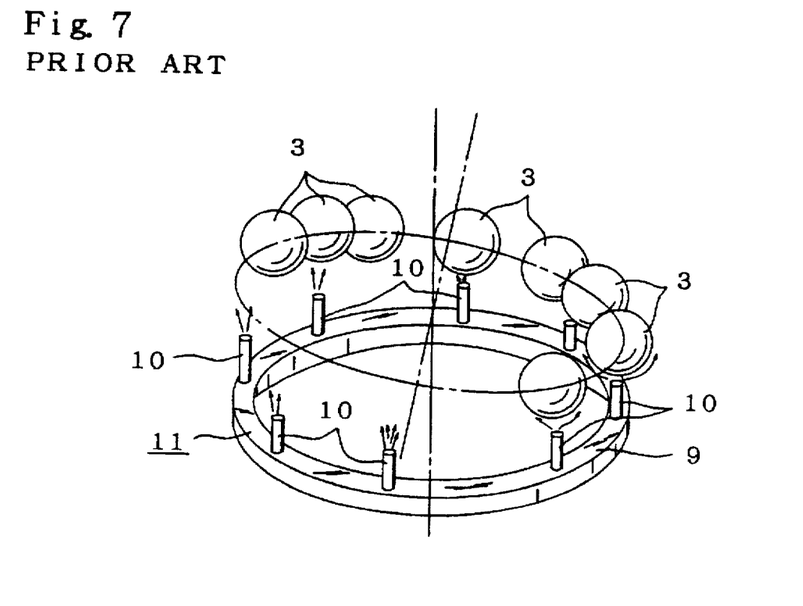
FIG. 7 is a perspective view showing a third embodiment of a method disclosed in the above publication.

FIG. 7 shows a third embodiment of the method disclosed in the abovementioned publication. With this embodiment, the nozzle apparatus 11 is rotated while at an incline with respect to the annular space 4 (FIG. 1) in which the plurality of balls 3 are disposed. The nozzles 10 of the nozzle apparatus 11 are thus brought one at a time close to the balls 3 so that the balls 3 are retained one by one at a location opposite to a respective nozzle 10.

Figure 8:
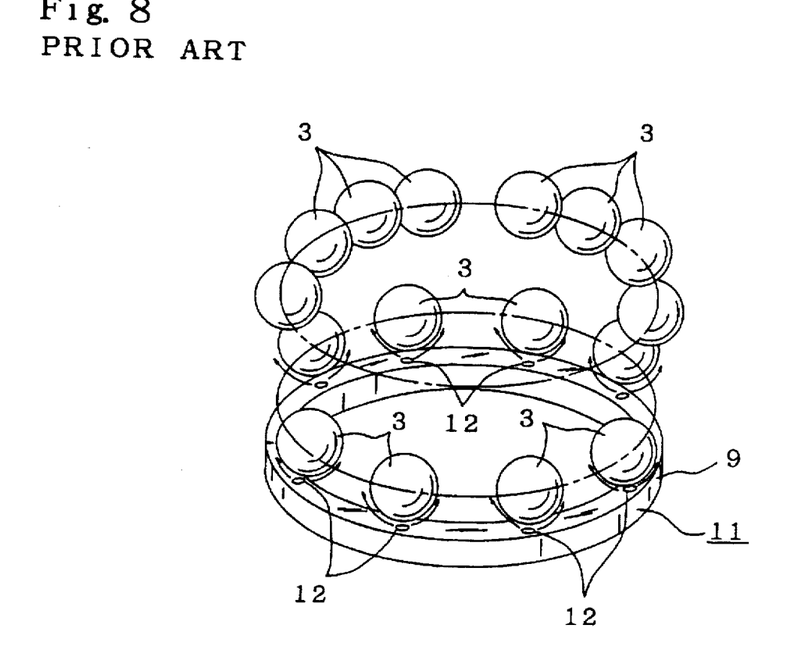
FIG. 8 is a perspective view showing a fourth embodiment of a method disclosed in the above publication.

FIG. 8 shows a fourth embodiment of the method disclosed in the abovementioned publication. This embodiment is for the case wherein the plurality of balls 3 of a double row ball bearing are evenly spaced one row at a time. Moreover in this embodiment, instead of the tubular nozzles 10 provided on the manifold 9 of the nozzle apparatus 11 as disclosed in the beforementioned embodiments (FIGS. 4 through 7), apertures 12 which function as nozzles are formed in one side face of the manifold 9.

With the heretofore known methods of evenly spacing the balls of a ball bearing disclosed in Japanese Patent First Publication KOKAI No. 5-104362 as described above, there can be a situation wherein the balls 3 cannot be evenly arranged in the circumferential direction. For example, in the case where the number of nozzles 10 is the same as the number of balls 3 as shown in FIG. 9, there is the likelihood of two adjacent nozzles 10 each capturing one ball 3 (i.e. two balls 3 in total), with another ball 3 sandwiched therebetween.

Therefore, once three balls 3 are held by two nozzles 10 in this way, even arrangement of the balls 3 in the circumferential direction is no longer possible.

Figure 9:
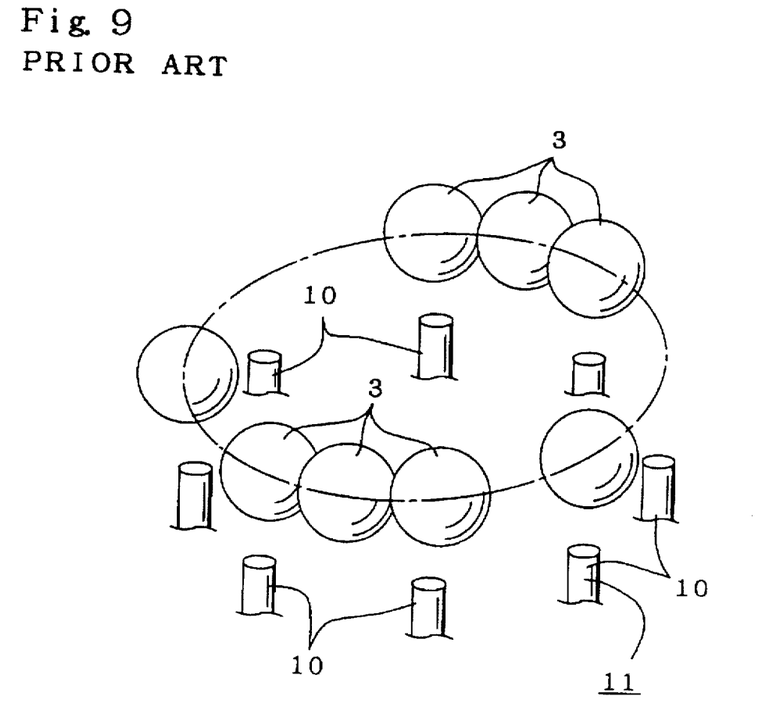
FIG. 9 is a perspective view showing a condition wherein the smooth positioning of the balls has been lost.

When the relationship between the nozzles 10 and the balls 3 is as shown in FIG. 9, then it is necessary to dislodge the balls 3 which have been positioned once, by vigorously oscillating the nozzles 10 in the circumferential direction, and then repeat the positioning operation. As a result the efficiency of the positioning operation deteriorates causing problems with ball bearing production efficiency. Also with the case shown in FIGS. 4(A) to 4(C) wherein there are twice as many nozzles 10 as balls 3, it is difficult to move a ball 3 which has become sandwiched at an intermediate location, so that the same problems arise.

Japanese Patent First Publication KOKAI No. 5-104361 discloses not only the case where compressed air is discharged from the nozzles, but also the case where air is drawn in. However in this case also the same unsatisfactory conditions arise.

SUMMARY OF THE INVENTION

Methods and apparatus of the present invention for evenly spacing the balls of a ball bearing addresses the above situation.

A ball bearing is assembled in the present invention by evenly spacing the balls through the pressurized air which is directed axially to the balls from a plurality of nozzles and agitated by an agitating plate provided adjacent the balls on the side remote from the nozzles, such that the balls are circumferentially moved before evenly spaced apart from each other.

DESCRIPTION OF THE PREFERRED EMBODIMENTS

The methods in the present invention involve, initially fitting a plurality of balls between an inner ring raceway on an outer peripheral surface of an inner ring and an outer ring raceway on an inner peripheral surface of an outer ring, after which a nozzle apparatus having at least as many nozzles as there are balls is arranged to the side of the inner ring and outer ring with the plurality of nozzles facing an opening at one end of an annular space between the inner raceway and the outer raceway, and a flow of pressurized fluid is produced by means of the plurality of nozzles to thereby move the plurality of balls circumferentially to evenly space them in the circumferential direction.

With a first aspect of the present invention, an agitating plate is arranged facing an opening at the other end of the annular space, and the flow of pressurized fluid produced by means of a plurality of nozzles is agitated by the agitating plate, so that balls clustered or gathered in close proximity are separated from each other, after which the plurality of balls are retained at an even spacing in the circumferential direction by means of the plurality of nozzles.

Moreover, with a second aspect of the present invention, an agitating plate having additional nozzles is arranged facing an opening at the other end of the annular space, and the flow of pressurized fluid produced by means of the plurality of nozzles is agitated by the agitating plate and by the flow of pressurized fluid produced by additional nozzles, so that balls clustered or gathered in close proximity are separated from each other, after which the plurality of balls are retained at an even spacing in the circumferential direction by means of the plurality of nozzles.

With the methods of evenly spacing the balls of a ball bearing in a circumferential direction according to the present invention, structured as described above, the plurality of balls can be separated in the circumferential direction by suitably displacing the agitating plate, and if necessary producing a flow of pressurized fluid by means of the additional nozzles. Accordingly, even in the situation wherein three balls are retained by two adjacent nozzles, the three balls can be separated in an efficient manner, so that the plurality of balls including these three balls, can be evenly spaced in the circumferential direction.

Figure 10:
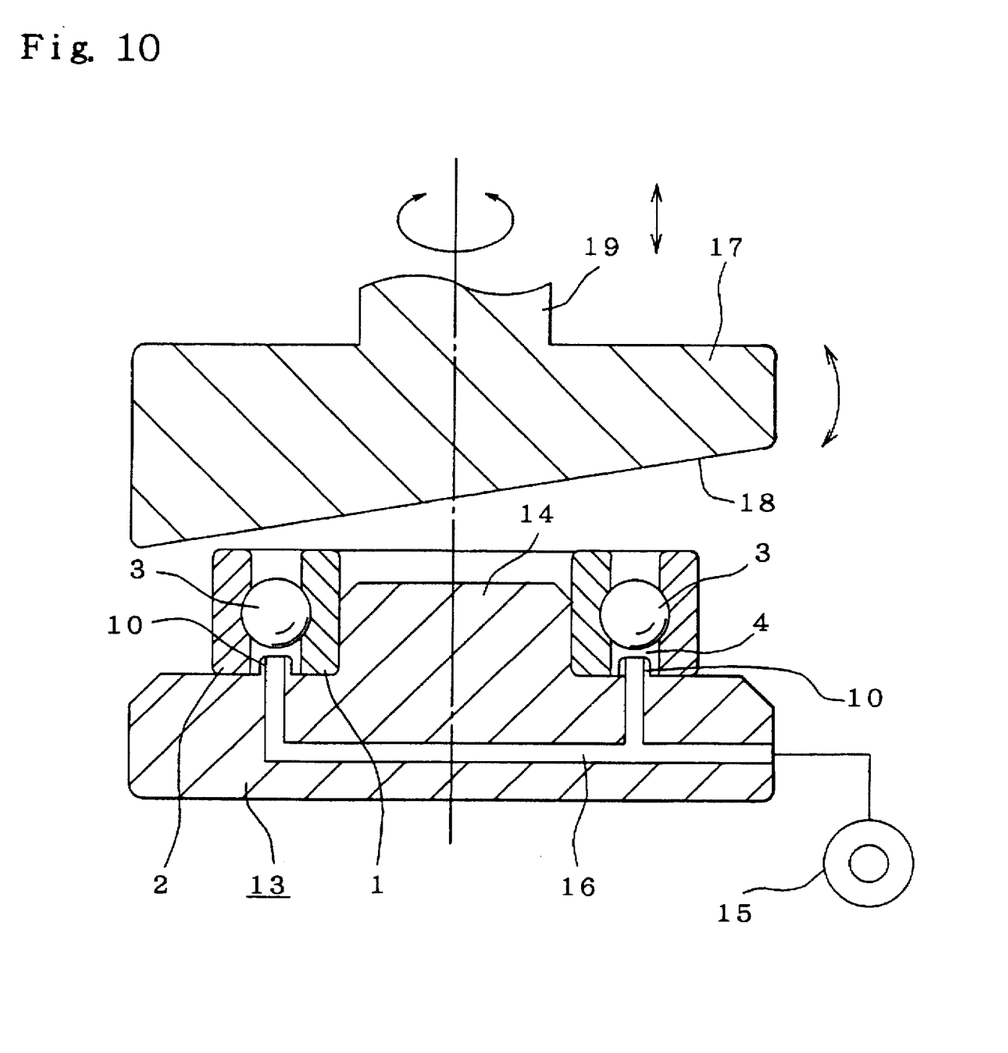
FIG. 10 is a longitudinal sectional view showing a first embodiment of the present invention.

Now, FIG. 10 shows a first embodiment according to a first aspect of the present invention. A mounting block 13 which also functions as a manifold, has a locating protrusion 14 formed on a central portion of an upper surface thereof, over which an inner ring 1 is freely but snugly fitted. A plurality of nozzles 10 of the same number as the number of balls 3 are protrudingly located around the locating protrusion 14 at locations facing a lower end opening of an annular space 4 between an outer peripheral face of an inner ring 1 and an inner peripheral face of an outer ring 2. Compressed air (pressurized fluid) is discharged from the upper ends of the respective nozzles 10. The compressed air is pumped from a compressor 15 and passes through a supply path 16 provided in the mounting block 13 to the respective nozzles 10. In this case there is no special provision for a solenoid valve between the supply path 16 and the nozzles 10.

Accordingly, when a solenoid valve (not shown in the figures) provided between the air tank of the compressor 15 and the supply path 16 is opened, the same quantity of compressed air is discharged from each of the nozzles 10 at the same velocity.

This construction is basically equivalent to the technology covered in Japanese Patent First Publication KOKAI No. 5-104362.

However, with the apparatus for performing the method of the present invention for evenly spacing the balls of a ball bearing, an agitating plate 17 is positioned above an upper end opening of the annular space 4, with a lower face 18 of the agitating plate 17 facing this opening of the annular space 4. The agitating plate 17 is in the form of a disc with the lower face 18 inclined to the diametral direction. Accordingly, the distance between the upper end opening of the annular space 4 and the lower face 18 of the agitating plate 17 changes continuously around the circumferential direction.

A central part of the upper face of the agitating plate 17 is connected to a lower end of a suspension rod 19 which is adapted to be moved up and down and rotated by means of a drive unit (not shown in the figure). Moreover, the drive unit also is adapted to rock or oscillated about a horizontal axis (not shown). Accordingly, the agitating plate 17 is supported just above the upper end opening of the annular space 4 and can be rotated, moved up and down, and rocked or oscillated. As a result, the distance between the lower face 18 of the agitating ring 2 can be adjusted freely around the circumferential direction.

Needless to say, a construction is also possible wherein the suspension rod 19 is rocked or oscillated directly by the drive unit.

In using the above described apparatus, the operation of arranging the plurality of balls 3 inserted into the annular space 4 at an even spacing in the circumferential direction, is carried out as follows. Initially, a bearing in which the plurality of balls 3 are unevenly spaced within the annular space 4 as shown in FIG. 1(A), is conveyed by a conveyor (not shown) to the mounting block 13 and then mounted as shown in FIG. 10, on the upper face thereof. Compressed air is then discharged from the plurality of nozzles 10 while moving the agitating plate 17 in the appropriate direction.

In this way, pairs of balls 3 which are clustered or gathered too close together in the annular space 4 can be separated while discharging compressed air from the plurality of nozzles 10, by moving the agitating plate 17 in the appropriate direction, that is to say, by rotating, moving up and down oscillating, and/or rocking the agitating plate 17. For example, even in the case shown in FIG. 9 wherein three balls 3 are captured by an adjacent pair of nozzles 10, the flow of compressed air discharged from the pair of nozzles 10 is agitated by the part of the lower face 18 close to the three balls 3, so that the three balls 3 can be separated by rotating, moving up and down, oscillating and/or rocking the agitating plate 17.

Once the plurality of balls 3 have all been separated in this way with assistance from the agitating plate 17, they can each be individually retained by the plurality of nozzles 10 in a similar manner to that described for the invention disclosed in Japanese Patent First Publication KOKAI No. 5-104362. Since the plurality of nozzles 10 are evenly spaced in the circumferential direction, then when each ball 3 is retained by a respective nozzles 10, the balls 3 also will be similarly evenly spaced.

Figure 11:
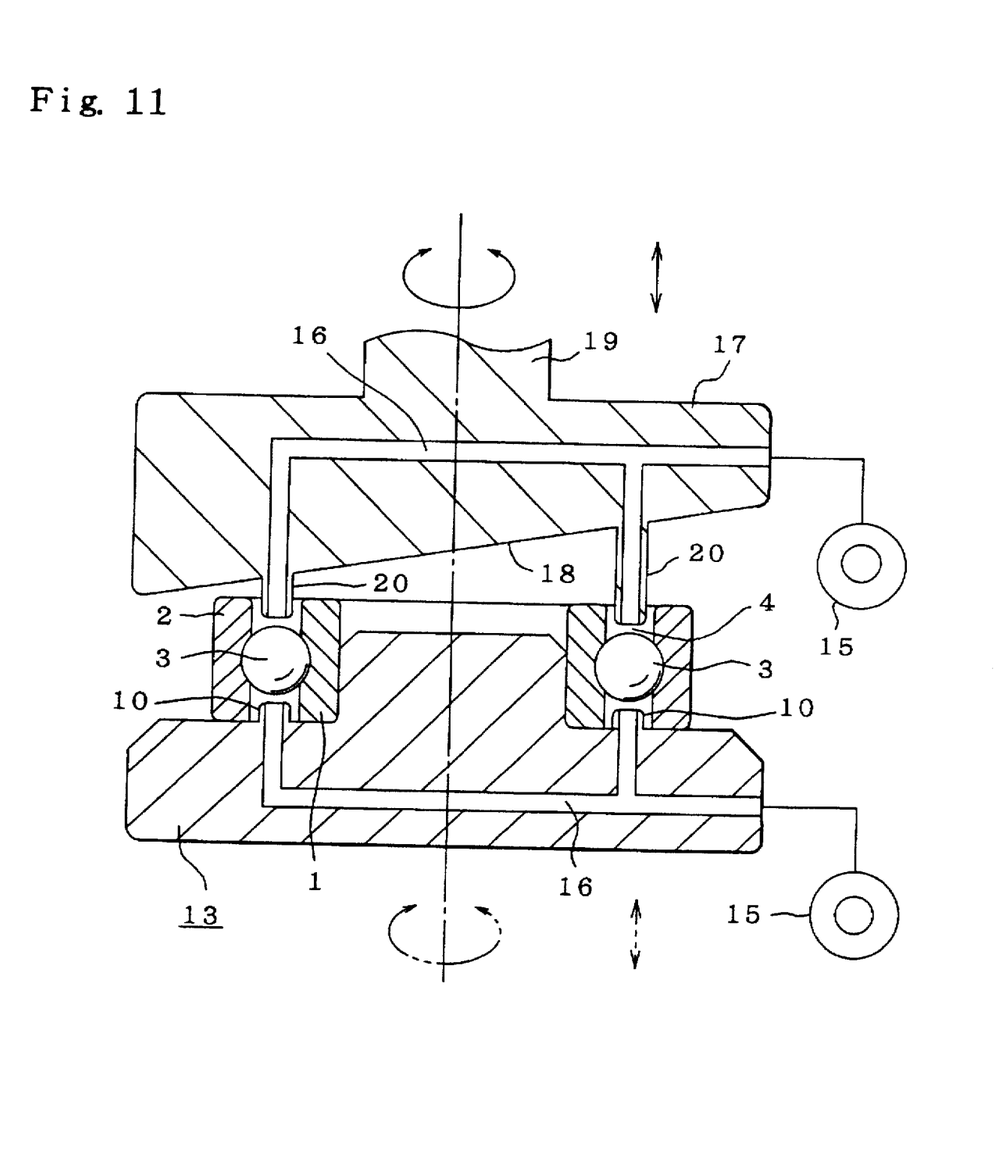
FIG. 11 is a longitudinal sectional view showing a second embodiment of the present invention.

FIG. 11 shows a second embodiment according to a second aspect of the present invention. With this embodiment, a plurality of additional nozzles 20 are provided on the lower face 18 of the agitating plate 17. In contrast to the number of nozzles 10 provided on the upper face of the mounting block 13, the number of additional nozzles 20 can be different from the number of balls 3 to be positioned, and they need not be arranged at even spacing around the circumferential direction. Rotation, up and down movement, and rocking or oscillating movement of the agitating plate 17 is carried out in a similar manner to the abovementioned first embodiment.

With this embodiment, compressed air can be discharged from the additional nozzles 20, during the discharge of compressed air from the respective nozzles 10, or before or after the discharge of compressed air from the nozzles 10, and the agitating plate 17 can be rotated, moved up and down, oscillated and rocked as required. As a result, the separation of balls 3 which have gathered too close can be carried out with even greater efficiency. Other details of construction and operation are the same as for the abovementioned first embodiment.

Figure 12:
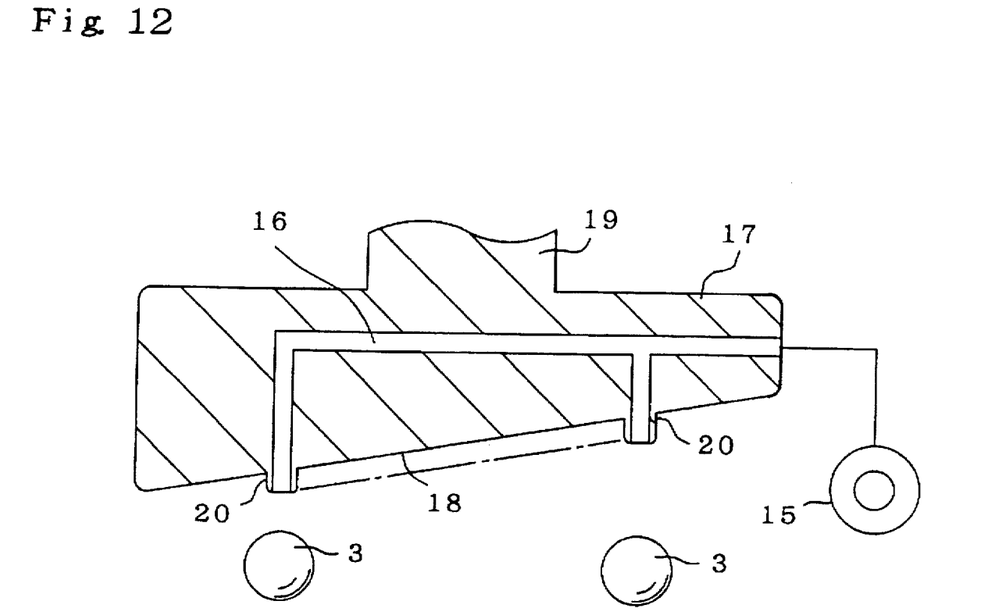
FIG. 12 is a longitudinal sectional view showing a third embodiment of the present invention.
Figure 13:
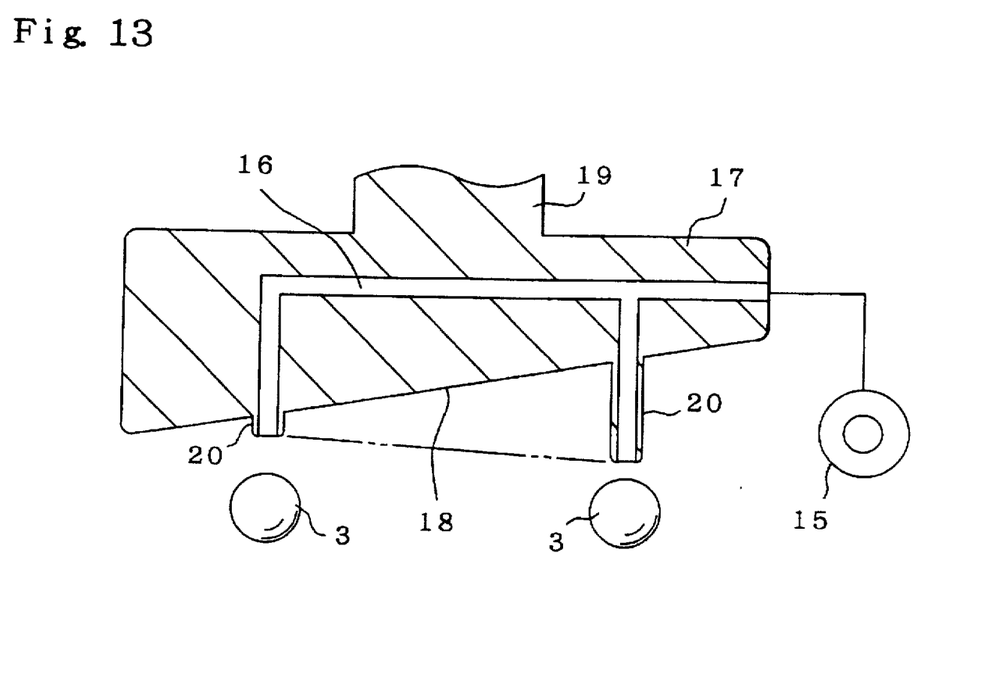
FIG. 13 is a longitudinal sectional view showing a fourth embodiment of the present invention.

FIGS. 12 and 13 show respective third and fourth embodiments according to the second aspect of the present invention. In contrast to the abovementioned second embodiment wherein the lower end locations of the additional nozzles 20 are all placed on the same height or level in the state where the suspension rod 19 is placed upright, with both these embodiments, the lower end locations of the additional nozzles 20 are placed on different heights or levels. In the case of the third embodiment shown in FIG. 12, the amount that the additional nozzles 20 protrude from the lower face 18 of the agitating plate 17 is made equal, so that the higher the location on the lower face 18, the higher the lower end location of the additional nozzles 20. Moreover in the case of the fourth embodiment as shown in FIG. 13, the amount that the additional nozzles 20 protrude from the lower face 18 is instead made different, so that the higher the location on the lower face 18, the lower the lower end location of the additional nozzles 20.

The above description of the various embodiments has been for the case wherein the respective nozzles 10 and the additional nozzles 20 are connected to a discharge outlet of a compressor, and compressed air is discharged from the respective nozzles 10 and 20.

However instead, the respective nozzle 10 and additional nozzles 20 may be either or both connected to a suction inlet of a compressor, and air drawn in from either or both of the nozzles to arrange the balls 3.

Moreover, if a fluid such as oil or organic solvent is used as the pressurized fluid, then the force for moving the balls 3 can be increased.

Furthermore, if solenoid valve are provided for each of the respective nozzles 10 and 20, so that the discharge of pressurized fluid from the respective nozzles 10 and 20 can be carried out independently for each nozzle, then the balls 3 can be moved much more precisely.

In addition, the number of nozzles 10 can be made greater than the number of balls 3 (for example, two or some other multiple times the number of balls).

Moreover, in the above described respective embodiments, the lower face 18 of the agitating plate 17 has a single inclined face. However the present invention is not necessarily limited to the lower face 18 having a single inclined face.

For example, a plurality of faces matching the number of balls 3 to be evenly spaced may be formed on the lower face 18, so as to modify the distance between the lower face 18 and the upper end opening of the annular space 4, whereby the object can be achieved.

Moreover, it is not necessary for the lower face 18 of the agitating plate 17 to be out of parallel with the upper face of the agitating plate 17. If a simple disc is held at an incline, then a similar operational effect to the embodiments shown in the figures can be obtained.

Furthermore, in contrast to the abovementioned respective embodiments, the agitating plate 17 may be fixed and the mounting block 13 rotated, moved up and down, oscillated and rocked to achieve the same object.

As a result of the above described construction and operation for the method of evenly spacing the balls of a ball bearing according to the present invention, since there is no damage to the balls or entry of foreign matter during the positioning operation, ball bearings with stable performance, and excellent endurance can be obtained. Moreover, since it is easy to separate balls which have become clustered together, the ball positioning operation is more efficient, resulting in an improvement in the efficiency of ball bearing production.

What is claimed is:

1. A method of evenly spacing a plurality of balls in a ball bearing, wherein after fitting a plurality of balls between an inner ring raceway on an outer peripheral surface of an inner ring and an outer ring raceway on an inner peripheral surface of an outer ring, a nozzle apparatus having at least as many nozzles as there are balls is arranged to the side of said inner ring and outer ring with the plurality of nozzles facing an opening at one end of an annular space between the inner ring raceway and the outer ring raceway, a flow of pressurized fluid is produced by the plurality of nozzles to thereby move the plurality of balls circumferentially to evenly space the balls in a circumferential direction, and an agitating plate is arranged facing an opening at the other end of the annular space, and the flow of pressurized fluid produced by the plurality of nozzles is agitated by the agitating plate to thereby separate gathered balls from each other, after which the plurality of balls are retained at an even spacing in the circumferential direction by the plurality of nozzles.

2. The method of claim 1, wherein the flow of pressurized fluid is produced by the plurality of nozzles to separate the gathered balls from each other while either the inner ring or the outer ring is moved with reference to the nozzles.

3. A method of evenly spacing a plurality of balls in a ball bearing, wherein after fitting a plurality of balls between an inner ring raceway on an outer peripheral surface of an inner ring and an outer ring raceway on an inner peripheral surface of an outer ring, a nozzle apparatus having at least as many nozzles as there are balls is arranged to the side of said inner ring and outer ring with the plurality of nozzles facing an opening at one end of an annular space between the inner ring raceway and the outer ring raceway, a flow of pressurized fluid is produced by the plurality of nozzles to thereby move the plurality of balls circumferentially to evenly space the balls in a circumferential direction, and an agitating plate having additional nozzles is arranged facing an opening at the other end of the annular space, and the flow of pressurized fluid produced by the plurality of nozzles is agitated by the agitating plate and by the flow of pressurized fluid produced by the additional nozzles to thereby separate gathered balls from each other, after which the plurality of balls are retained at an even spacing in the circumferential direction by the plurality of nozzles.

4. The method of claim 3, wherein the flow of pressurized fluid is produced by the plurality of nozzles to separate the gathered balls from each other while either the inner ring or the outer ring is moved with reference to the nozzles.

5. A method of assembling a ball bearing having an inner ring with an inner ring raceway, an outer ring with an outer ring raceway and a plurality of balls provided in an annular space between the inner ring raceway and the outer ring raceway, comprising the steps of fitting the plurality of balls between the inner ring raceway and the outer ring raceway, providing a nozzle apparatus having at least as many nozzles as the plurality of balls so that the nozzles are faced to the annular space between the inner ring race way and the outer ring raceway on one side of the annular space, producing a flow of pressurized fluid through the nozzles to move the plurality of balls circumferentially, and providing an agitating plate to face an opening between the inner ring raceway and the outer ring raceway on the other side of the annular space, so that a flow of pressurized fluid produced by the nozzles of the nozzle apparatus is agitated by the agitating plate to separate gathered balls from each other, and retaining the plurality of balls circumferentially at an even spacing through the flow of pressurized fluid produced by the nozzles.

6. A method of assembling a ball bearing having an inner ring with an inner ring raceway, an outer ring with an outer ring raceway and a plurality of balls provided in an annular space between the inner ring raceway and the outer ring raceway, comprising the steps of fitting the plurality of balls between the inner ring raceway and the outer ring raceway, providing a nozzle apparatus having at least as many nozzles as the plurality of balls so that the nozzles are faced to the annular space between the inner ring race way and the outer ring raceway on one side of the annular space, producing a flow of pressurized fluid through the nozzles to move the plurality of balls circumferentially, and providing an agitating plate with nozzles to be faced to between the inner ring raceway and the outer ring raceway on the other side of the annular space, so that a flow of pressurized fluid produced by the nozzles of the nozzle apparatus is agitated by the agitating plate and by a flow of fluid produced by the nozzles of the agitating plate to separate gathered balls from each other, and retaining the plurality of balls circumferentially at an even spacing through the flow of pressurized fluid produced by the nozzles.

* * * * *